G. R. STETSON.
Machine for Clearing Twist Drills.
No. 195,963.  Patented Oct. 9, 1877.
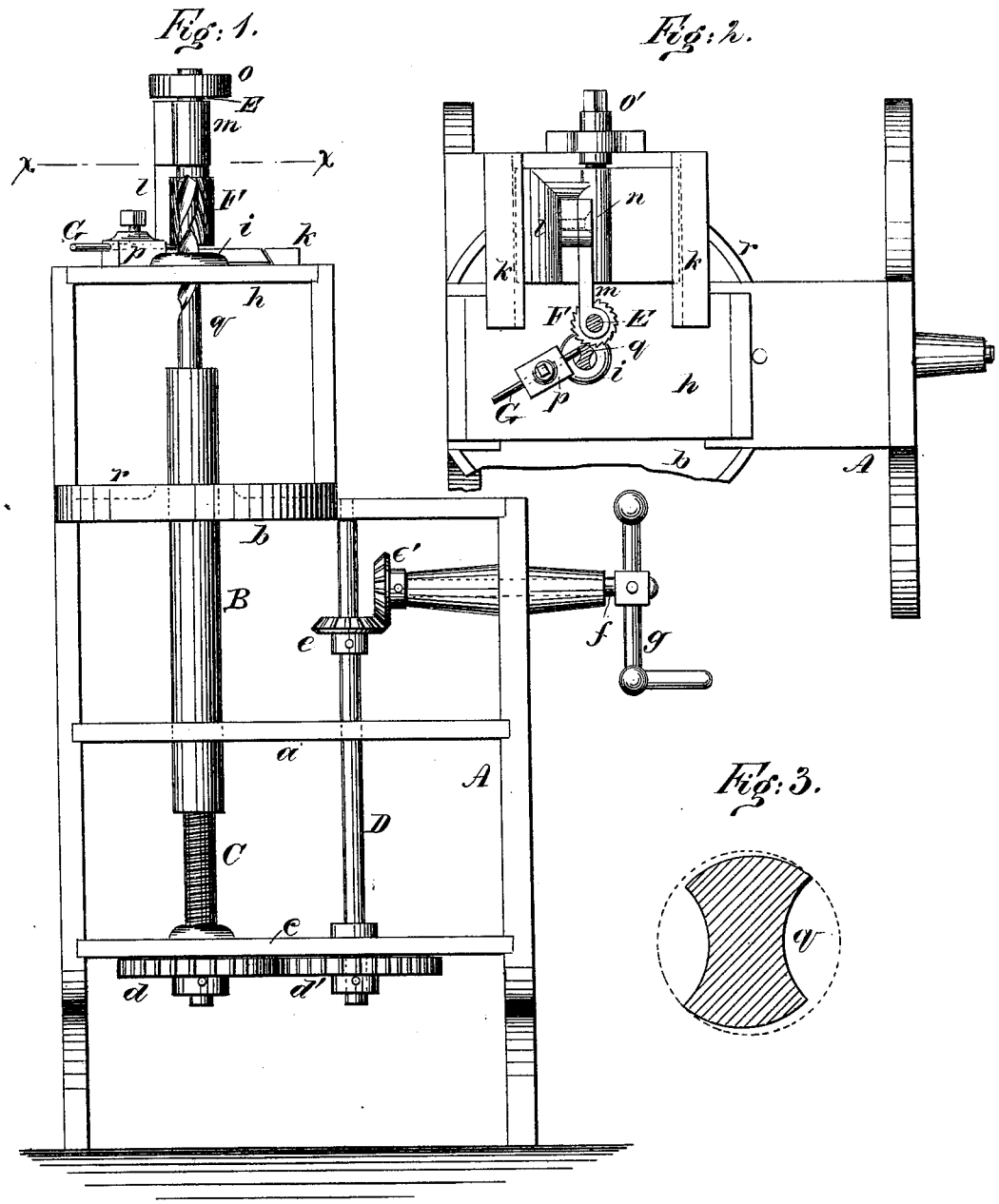
WITNESSES:
Chas Nida
J. H. Scarborough
INVENTOR:
G. R. Stetson
BY Munn &c
ATTORNEYS.

UNITED STATES PATENT OFFICE.

GEORGE R. STETSON, OF NEW BEDFORD, MASS., ASSIGNOR TO HIMSELF AND MORSE TWIST DRILL AND MACHINE COMPANY, OF SAME PLACE.

IMPROVEMENT IN MACHINES FOR CLEARING TWIST-DRILLS.

Specification forming part of Letters Patent No. 195,963, dated October 9, 1877; application filed August 3, 1877.

*To all whom it may concern:*

Be it known that I, GEORGE R. STETSON, of New Bedford, in the county of Bristol and State of Massachusetts, have invented a new and Improved Machine for Clearing Twist-Drills, of which the following is a specification:

Figure 1 is a front elevation of my improved machine. Fig. 2 is a plan view, in section, on line $x\,x$ in Fig. 1. Fig. 3 is an enlarged transverse section of a drill which has been cleared by the machine.

Similar letters of reference indicate corresponding parts.

In the manufacture of twist-drills it is required to clear them or reduce them in diameter from the cutting-edge of the spiral. To effect this expeditiously and perfectly is the object of my invention.

In the drawing, A is a frame, which may be of any suitable design; and B is a spindle, which passes through a cross-bar, $a$, and circular plate $b$, both forming parts of the frame. The spindle B is bored longitudinally from each end. The lower end is tapped, and to it a screw, C, is fitted, which is journaled in the lower cross-bar $c$ of the frame A, and prevented from moving longitudinally by a collar above the cross-bar, and a spur-wheel, $d$, below the cross-bar. A spur-wheel, $d'$, is secured to the lower end of a shaft, D, which is journaled in the frame A, and upon which a miter-wheel, $c$, is placed. This wheel is carried by a miter-wheel, $c'$, placed on the horizontal shaft $f$, which is journaled in the frame A, and is provided with a crank-handle, $g$.

The upper end of the spindle B is bored to receive the shank of the drill, $q$, to be operated upon, and is provided with a set-screw for clamping it. Above the circular plate $b$ a plate, $h$, is supported, in which, directly over the spindle B, there is an aperture for receiving the bush $i$. There may be several of these bushes of different sizes, to adapt the machine to various sizes of drills.

Upon the plate $h$ there are ways $k$, to which is fitted a standard, $l$. To this standard an arm, $m$, is pivoted at $n$, in which a mandrel, E, is journaled. Upon the lower end of this mandrel a mill or cutter, F, is secured, and to the upper end a pulley, $o$, is fixed. In the standard $l$ an arc-shaped slot is made, through which a clamping-screw passes into the arm $m$.

By means of this arrangement the mandrel E may be inclined more or less to the axis of the drill. The upper end of the cutter is inclined toward the center of the drill, and this inclination is varied to give the proper clearance to drills of different sizes. This object may also be attained by using a conical cutter or mill with the larger end upward.

A screw, $o'$, is journaled in an ear formed on the plate $h$, and engages a nut formed in the standard $l$, for moving the mandrel E toward or away from the drill.

G is a finger, that passes through a holder, $p$, and engages the spiral slot in the drill $q$, as the latter is moved downward by turning the screw C by means of the crank $g$ and the intermediate gearing. As the drill passes downward it is always kept in the proper relation with the cutter by the finger.

The plate $b$ is provided with a rim, $r$, which retains the oil and chips.

I do not limit or confine myself to the exact form, position, or construction of the parts composing my improvement, as they may be varied without departing from my invention.

Having thus described my invention, I claim as new and desire to secure by Letters Patent—

The inclined cutter F, in combination with the movable spindle B and finger G, substantially as shown and described.

GEORGE R. STETSON.

Witnesses:
FRANCIS B. GREENE,
LEML. P. WILLCOX.